United States Patent [19]

Steffes et al.

[11] Patent Number: 4,922,749

[45] Date of Patent: May 8, 1990

[54] ENGINE CRANKSHAFT INDEXING METHOD AND TOOL

[75] Inventors: Thomas J. Steffes, Fond du Lac; Paul A. Feyen; Wesley R. Martin, both of Oshkosh, all of Wis.

[73] Assignee: Brunswick Corporation, Skokie, Ill.

[21] Appl. No.: 305,740

[22] Filed: Feb. 2, 1989

[51] Int. Cl.$^5$ .......................................... G01M 15/00
[52] U.S. Cl. ...................................... 73/116; 74/15.63
[58] Field of Search ................... 73/116; 403/24, 33, 403/269, 309; 81/9.24, 52; 74/548, 15.63; 33/1 N, 600, 601, 602, 603, 604, 605, 606, 607, DIG. 15; 116/DIG. 21

[56] References Cited

U.S. PATENT DOCUMENTS 3,828,878 8/1974 Clapsaddle, Jr. ............. 74/15.63 X
4,580,446 4/1986 Ansteth ............................... 73/116

Primary Examiner—Jerry W. Myracle
Attorney, Agent, or Firm—Andrus, Sceales, Starke & Sawall

[57] ABSTRACT

A crankshaft rotation tool and method is provided to facilitate test and repair adjustments requiring precise indexing of rotational degrees of the crankshaft. The tool engages and imparts rotation to existing bolts mounting an existing pulley to the crankshaft.

19 Claims, 3 Drawing Sheets

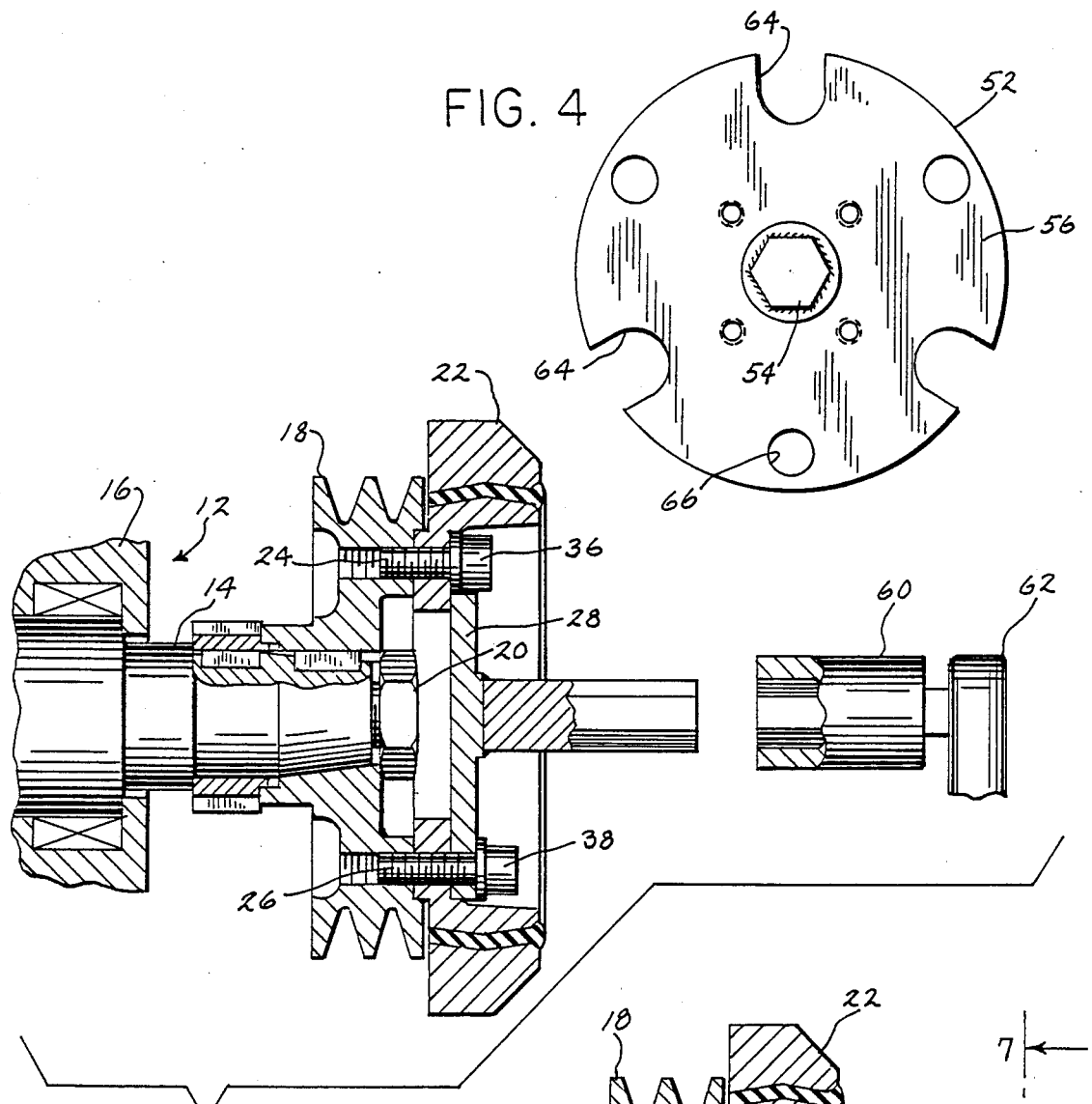
FIG. 4
FIG. 5
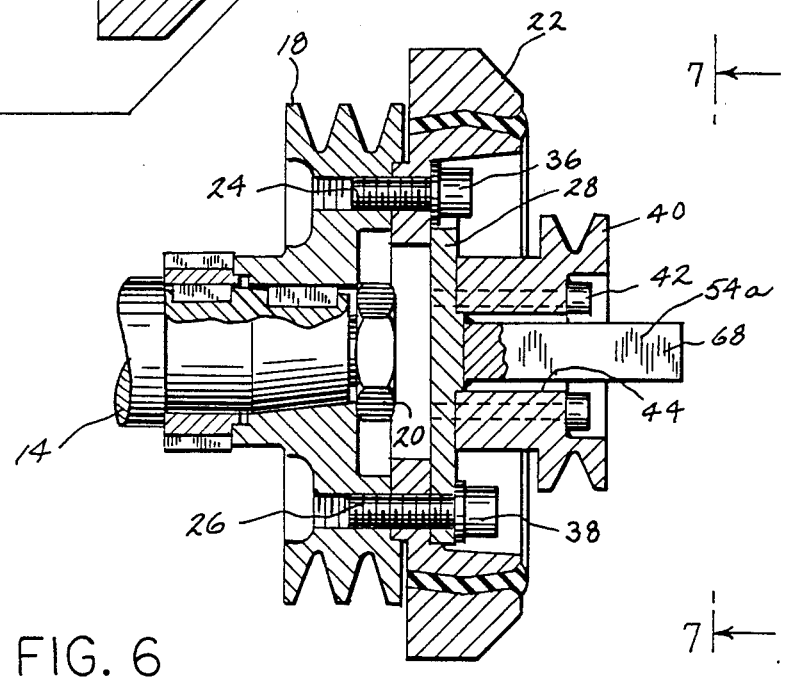
FIG. 6

ENGINE CRANKSHAFT INDEXING METHOD AND TOOL

BACKGROUND AND SUMMARY

The invention relates to rotational indexing of a crankshaft in an internal combustion engine to facilitate test and repair adjustments requiring precise indexing of rotational degrees of the crankshaft.

The invention particularly arose from a need to provide precise indexing on marine diesel engines subject to heavy usage, which requires frequent and periodic valve clearance adjustment. Diesel engines raise the particular problem of a high compression ratio pressure head to be overcome in torquing or rotating the engine through precise small scale indexed angular degrees. This problem is further amplified in those applications where the mechanic may wish to not relieve compression pressure in any of the cylinders by removing a glow plug or the like, to avoid the necessity of installing a new gasket and resealing such broken seal. In such applications, the high pressure head which must be overcome in minutely rotationally indexing the crankshaft presents problems as to preciseness and exactness.

In previous diesel engines and the like, extended bolts were provided on the crankshaft pulley, and a pry bar was used thereacross to rotate the engine. In another prior method, the starter motor is used to rotate the engine. None of these prior systems satisfies the need to accurately rotate the engine for precise indexing of rotational degrees of the crankshaft to facilitate test and repair adjustments. The present invention addresses and solves this problem in a particularly simple and efficient manner.

BRIEF DESCRIPTION OF THE DRAWINGS

Prior Art

Present Invention

Figure 3:
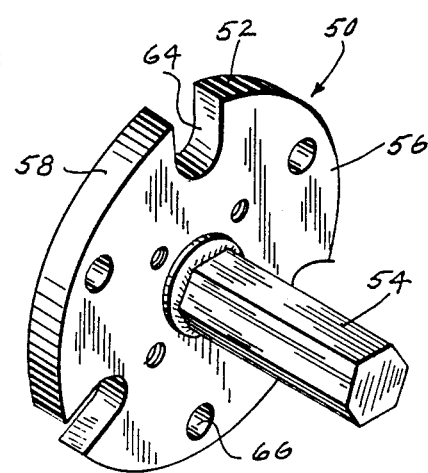

FIG. 3 is a perspective view of a tool constructed in accordance with the present invention.

FIG. 4 is an end view of the tool of FIG. 3.

Figure 2:
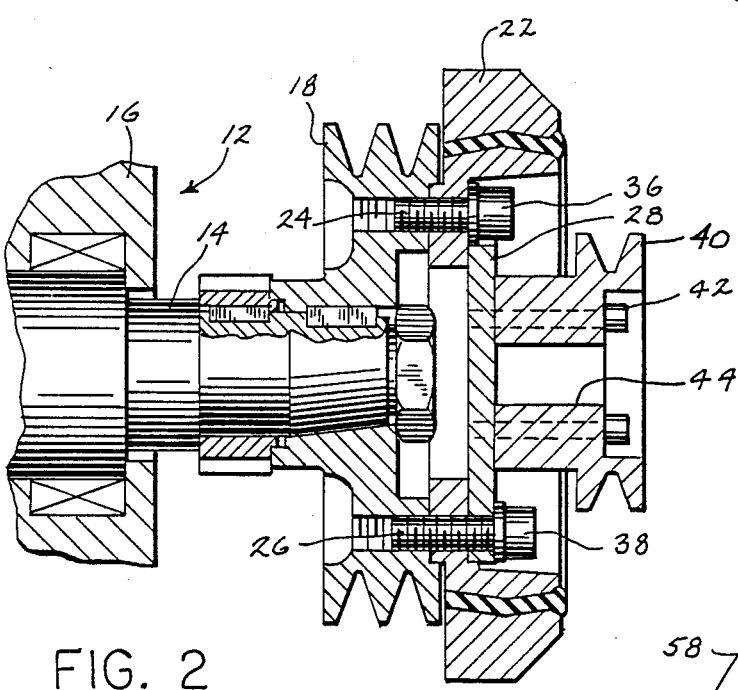
FIG. 2 is a sectional view of the structure of FIG. 1.

FIG. 5 is a sectional view like FIG. 2 and shows use of the tool of the present invention.

FIG. 6 is a sectional view like FIG. 5 and shows a further embodiment.

Figure 7:
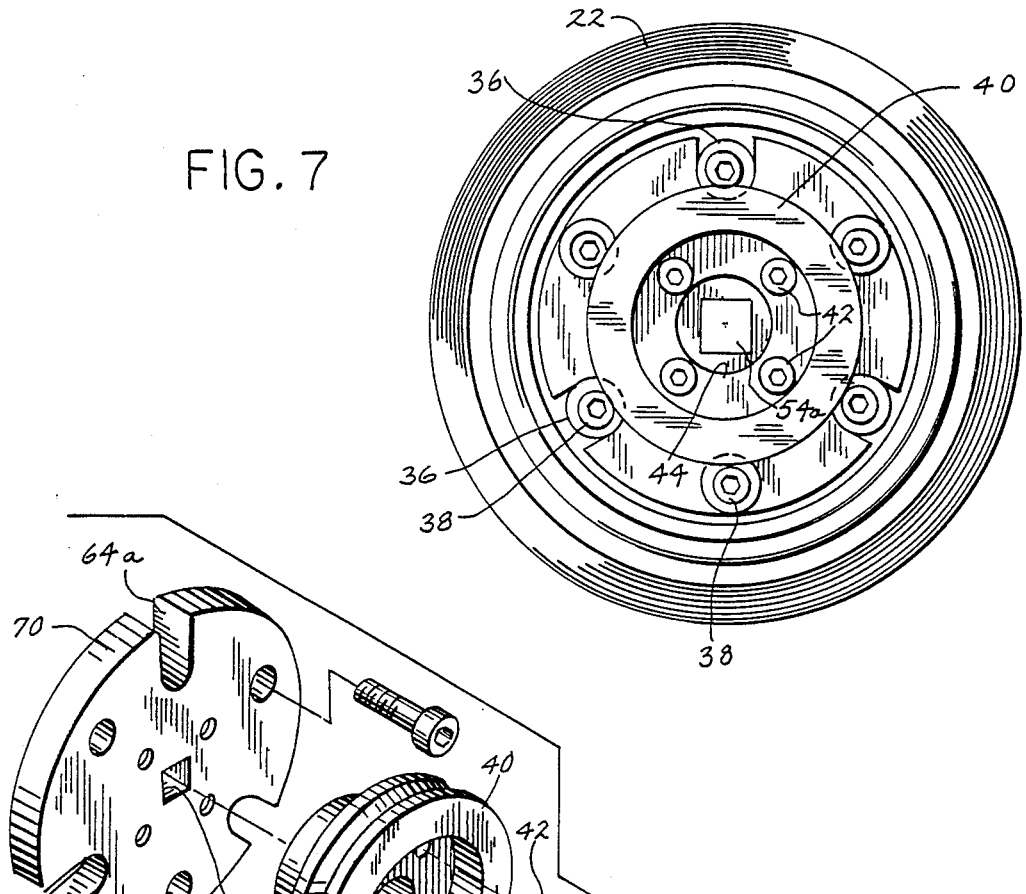

FIG. 7 is a view taken along line 7—7 of FIG. 6.

Figure 8:
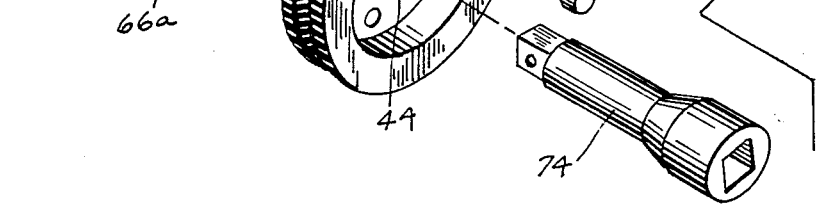

FIG. 8 is an exploded perspective view showing alternative structure in accordance with the invention.

Figure 9:
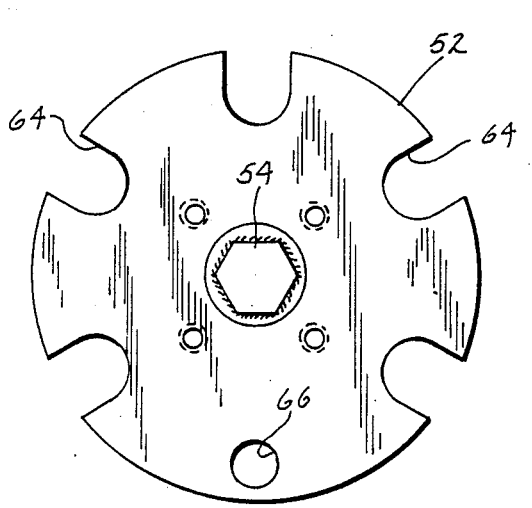

FIG. 9 is an end view like FIG. 4 and shows another embodiment.

Figure 10:
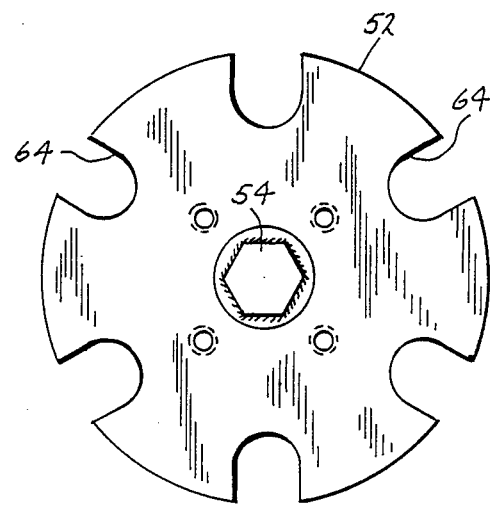

FIG. 10 is an end view like FIG. 4 and shows another embodiment.

DETAILED DESCRIPTION

Prior Art

Figure 1:
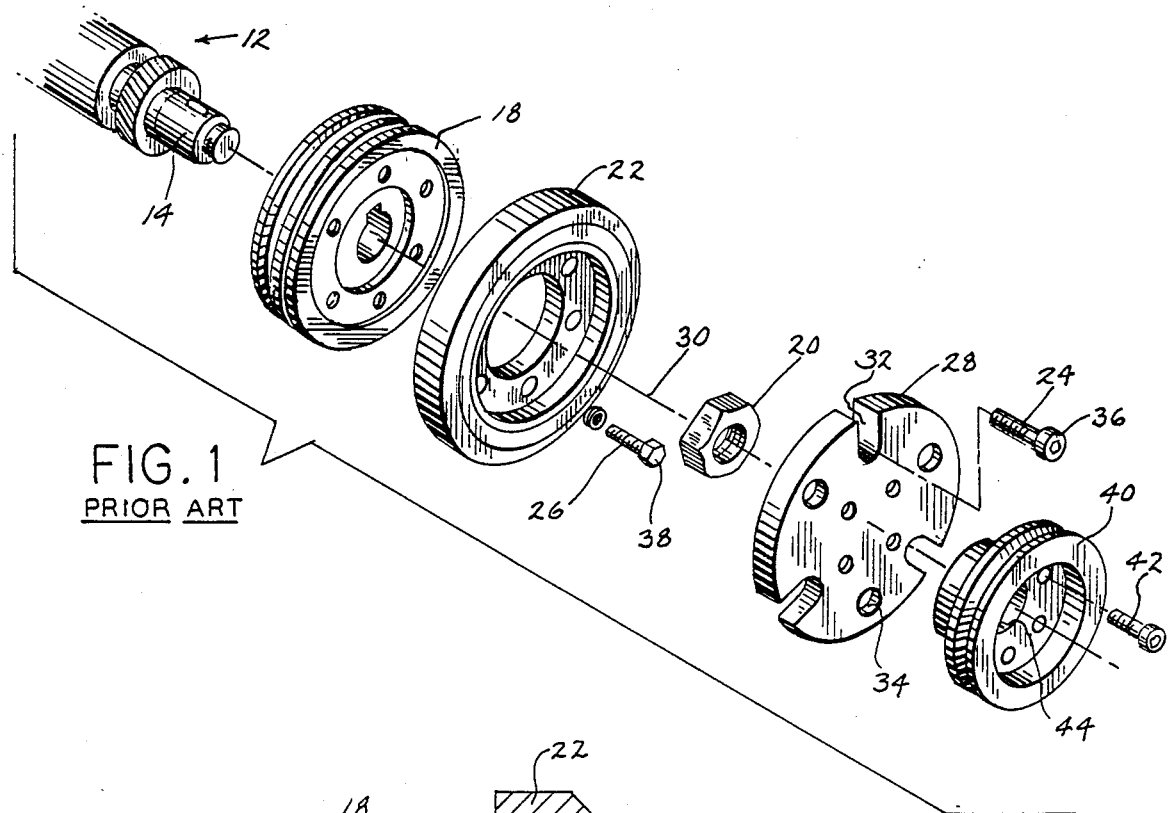
FIG. 1 shows an exploded perspective view of a portion of an internal combustion engine known in the prior art.

FIGS. 1 and 2 show an internal combustion engine 12 having a crankshaft 14 extending axially from a crankcase 16. An alternator and accessory pulley 18 is mounted to the end of the crankshaft by a nut 20. A vibration damper or harmonic balancer 22, where needed, is mounted to pulley 18 by a plurality of bolts such as 24 and 26, and a flat disc 28 is mounted to pulley 18 by the same bolts, with harmonic balancer 22 between disc 28 and pulley 18. The plurality of bolts such as 24 and 26 extend around an inner periphery of harmonic balancer 22 and pulley 18, radially outward of the axis 30 of rotation of crankshaft 14. Disc 28 extends radially from axis 30 and has a plurality of openings such as 32 and 34 receiving respective bolts. The bolts have enlarged heads, e.g. at 36 and 38. Openings such as 32 have a diameter larger than the diameter of the respective bolt head, such as 36, and slides thereover upon attachment of disc 28. Opening such as 34 have a diameter smaller than the respective bolt head such as 38, such that bolt 26 extends through opening 34 and through harmonic balancer 22 into pulley 18 and mounts disc 28 to pulley 18 by engagement of bolt head 38 against the right face of disc 28.

In engines with power steering, power steering pulley 40 is mounted to disc 28 by a plurality of bolts such as 42 extending around an inner periphery radially inward of bolts 24, 26. Pulley 40 has a central axial opening 44 therein.

During test and repair adjustments requiring crankshaft rotation in such prior engines, it is known to provide elongated bolts into pulley 40 or 18, and to use a pry bar to rotate the crankshaft. Another method is to use the starter motor to rotate the crankshaft.

Present Invention

FIGS. 3-10 illustrate the present invention and use like reference numerals from FIGS. 1 and 2 where appropriate to facilitate clarity.

FIGS. 3 and 4 show an engine crankshaft rotation tool 50 comprising a disc 52 removably attachable to pulley 18, with or without harmonic balancer 22, and having a shank 54 extending axially from tool disc 52 on the opposite side 56 of the disc from the crankshaft side 58, and axially colinear with crankshaft 14. Shank 54 is grippable for rotating such shank. For example, shank 54 has a hex, square or other configuration grippable by a socket such as 60, FIG. 5, for rotation by a breaker bar or ratchet such as 62. Rotation of shank 54 rotates disc 52 which engages at its openings such as 64 and 66 respective bolts such as 24 and 26 at respective bolt heads 36 and 38 and imparts rotation to pulley 18 and crankshaft 14.

In the repair procedure, the plurality of bolts 42 are removed, followed by removal of pulley 40, followed by removal of bolts such as 26, followed by removal of disc 28. Tool 50 is then applied such that openings such as 64 around its periphery engage respective bolts at heads such as 36 to enable the noted impartation of rotation for the noted indexing of rotational degrees of crankshaft 14. In diesel engines, it is particularly desirable to remove bolts such as 26 prior to application and engagement of tool 50, and then reinsert bolts such as 26 back through openings or holes such as 66 in tool disc 52 to attach the tool to pulley 18 and prevent slippage there-off during rotational indexing of crankshaft 14 against the high torque high compression pressure of a diesel engine, without removing the compression-relieving seals such as at glow plugs or the like. This is attractive to mechanics at a time saving and quality improving measure.

After rotational indexing, bolts such as 26 are removed, followed by removal of tool 50, followed by reinstallation of disc 28 and bolts such as 26, followed by reinstallation of pulley 40 and bolts such as 42.

In the embodiment shown in FIGS. 3-5, tool 50 is a one-piece member wherein shank 54 is welded to or otherwise integrally connected to disc 52. In this embodiment, an alternative to that above described is to replace disc 28 by disc 52 which remains permanently installed in the engine, with shank 54 extending axially from disc face 56 through axial opening 44 of pulley 40 and remaining therein during the final assembled condition of the engine, without removal of other parts otherwise necessary for rotational indexing of the crankshaft during test and repair adjustment. In FIGS. 6 and 7, square shank 54a is integrally welded to disc 52. Shank 54a and disc 52 remain in place after assembly of the engine, and after the noted test and repair adjustments involving rotational indexing of the crankshaft. The end 68 of shank 54a extends rightwardly beyond pulley 40 for gripping by a socket 60, wrench, or the like, to rotate shank 54a to facilitate the noted test and repair adjustments requiring precise indexing of rotational degrees of crankshaft 14.

In FIG. 8, disc 70, corresponding to disc 52, has a central configured or keyed opening 72 axially colinear with crankshaft 14 and receiving in keyed relation a shank 74, such as an extension for a socket or ratchet wrench, or the like. Disc 70 includes openings 64a and 66a comparable to openings 64 and 66 in FIGS. 3 and 4. In the embodiment in FIG. 8, disc 70 replaces disc 28 in FIG. 1 and remains installed as part of the engine. Upon test and repair adjustments requiring precise indexing of rotational degrees of crankshaft 14, shank 74 is inserted through opening 44 of pulley 40 into configured opening 72 in keyed relation therewith. During test and repair adjustment, rotation of shank 74 inparts rotation to disc 70 which rotates pulley 18 which rotates crankshaft 14. After indexing rotation, shank 74 is removed from opening 72 of disc 70 through opening 44 of pulley 40.

FIG. 9 shows an alternate embodiment involving five enlarged openings or slots 64 of a diameter larger than the diameter of the respective bolt heads such as 36, 38, to slide thereover during attachment of the tool disc to pulley 18. The remaining opening 66 has a diameter smaller than respective bolt head 38 such that the tool disc is held on pulley 18 by bolt 26 where desired in hard turning applications, such as diesel engines. FIG. 10 shows another alternate embodiment wherein all of the openings 64 have a diameter larger than the respective bolt heads.

It is recognized that various equivalents, alternatives and modifications are possible within the scope of the appended claims.

We claim:

1. In an internal combustion enging having a crankshaft extending axially from a crankcase, a pulley mounted to said crankshaft by a nut, and a disc mounted to said pulley by a plurality of bolts and covering said nut, a method for rotating siad crankshaft to facilitate test and repair adjustments requiring precise indexing of rotational degrees of said crankshaft, comprising removing one or more of said bolts, removing said disc, providing a tool having a disc and an axial shank, engaging said tool disc with the remaining of said bolts, and rotating said shank to rotate said tool disc to impart rotation to said pulley and said crankshaft.

2. The invention according to claim 1 comprising disengaging said tool disc from said remaining bolts after said rotational indexing, and replacing said first mentioned disc against and reinserting said removed bolts.

3. The invention according to claim 2 comprising, after engaging said tool disc with said remaining bolts reinserting at least one of said removed bolts back through said tool disc and into said pulley to retain said tool disc on said pulley during said rotational indexing to facilitate same, particularly in high compression applications, such as in diesel engines, and then removing said last mentioned bolt after said rotational indexing, then disengaging said tool disc from said remaining bolts, then reinstalling said first disc against and reinserting said removed bolts through said first disc and into said pulley.

4. In an internal combustion engine having a crankshaft extending axially from a crankcase, a pulley mounted to said crankshaft, and a disc mounted to said pulley, a method for rotating said crankshaft to facilitate test and repair adjustments requiring precise indexing of rotational degrees of said crankshaft, comprising providing a central keyed opening in said disc axially colinear with said crankshaft, inserting a keyed shank axially into said disc in keyed relation with said opening, rotating said shank to rotate said disc, said pulley and said crankshaft to facilitate test and repair adjustments requiring precise indexing of rotational degrees of said crankshaft, and removing said shank from said central keyed opening in said disc following said indexing rotation, said disc remaining in place on said engine after said rotational indexing.

5. In an internal combustion engine having a crankshaft extending axially from a crankcase, a pulley mounted to said crankshaft, and a disc mounted to said pulley, a method for rotating said crankshaft to facilitate test and repair adjustments requiring precise indexing of rotational degrees of said crankshaft, comprising providing a shank on said disc extending axially therefrom on the opposite side thereof from said crankshaft and axially colinear with said crankshaft, and rotating said shank to rotate said disc, said pulley and said crankshaft to provide said rotational indexing, leaving said disc and said shank in place on said engine after said rotational indexing, without removing said disc and said shank.

6. In an internal combustion engine having a crankshaft extending axially from a crankcase, a first pulley mounted to said crankshaft, a disc mounted to said first pulley, and a second pulley mounted to said disc, a method for rotating said crankshaft to facilitate test and repair adjustments requiring precise indexing of rotational degrees of said crankshaft without requiring removal of either of said pulleys nor said disc, comprising providing a central keyed opening in said disc coaxial with said crankshaft, inserting a shank having an outer keyed configuration through said second pulley and into said keyed opening in said disc in keyed relation therewith, rotating said shank to rotate said disc, said second pulley, said first pulley, and said crankshaft to provide said rotational indexing, removing said shank from said keyed opening in said disc axially through said second pulley.

7. In an internal combustion engine having a crankshaft extending axially from a crankcase, a first pulley mounted to said crankshaft, a disc mounted to said first pulley, and a second pulley mounted to said disc, a method for rotating said crankshaft to facilitate test and repair adjustments requiring precise indexing of rotational degrees of said crankshaft, without removing either of said pulleys nor said disc, comprising providing a shank extending axially through said second pulley from the side of said disc opposite said crankshaft and axially colinear with said crankshaft, rotating said shank to rotate said disc, said second pulley, said first pulley and said crankshaft to provide said rotational indexing, said shank remaining on said disc and extending axially through said second pulley after said rotational indexing.

8. In an internal combustion engine having a crankshaft extending axially from a crankcase, a first pulley mounted to said crankshaft, a disc mounted to said pulley by a first plurality of bolts, a second pulley mounted to said disc by a second plurality of bolts, a method for rotating said crankshaft to facilitate test and repair adjustments requiring precise indexing of rotational degrees of said crankshaft, comprising removing said second plurality of bolts, removing said second pulley from said disc, removing one or more of said first plurality of bolts, removing said disc, providing a tool having a tool disc and an axial shank extending therefrom, engaging said tool disc with the remaining of said first plurality of bolts, rotating said shank to rotate said tool disc, said first pulley and said crankshaft to provide said rotational indexing, removing said tool, reinstalling said first mentioned disc and reinserting the remaining of said first plurality of bolts, and reinstalling said second pulley and reinserting said second plurality of bolts.

9. The invention according to claim 8 comprising reinserting at least one of the removed of said first plurality of bolts through said tool disc into said first pulley prior to said rotational indexing, and then removing said last mentioned at least one bolt after said rotational indexing.

10. A crankshaft rotation tool for an internal combustion engine having a crankshaft extending axially from a crankcase, and a pulley mounted to said crankshaft, said tool comprising a disc removably attachable to said pulley and having a shank extending axially from said disc on the opposite side of said disc from said crankshaft and axially colinear with said crankshaft, said shank being grippable for rotating said shank, disc, pulley and crankshaft, to facilitate test and repair adjustments requiring precise indexing of rotation degrees of said crankshaft, a second pulley mounted to said disc on the opposite side from said crankshaft and having an axial opening therethrough, and wherein said disc remains attached to said first mentioned pulley after said test and repair adjustments.

11. The invention according to claim 10 wherein said shank is integrally attached to said disc and remains in said axial opening in said second pulley after said test and repair adjustments.

12. The invention according to claim 10 wherein said disc has a central keyed opening therein receiving said shank in keyed relation said shank being removed from said keyed opening in said disc through said axial opening in said second pulley after said test and repair adjustments.

13. A crankshaft rotation tool for an internal combustion engine having a crankshaft extending axially from a crankcase, and a pulley mounted to said crankshaft, said tool comprising a disc removably attachable to said pulley and having a shank extending axially from said disc on the opposite side of said disc from said crankshaft and axially colinear with said crankshaft, said shank being grippable for rotating said shank, disc, pulley and crankshaft, to facilitate test and repair adjustments requiring precise indexing of rotation degrees of said crankshaft, wherein said tool is a two-piece member comprising said disc and said shank, said disc having a central keyed opening therein removably receiving said shank therein in keyed relation.

14. In an internal combustion engine having a crankshaft extending axially from a crankcase, a pulley mounted to said crankshaft, and a plurality of bolts around a periphery of said pulley radially outward of the axis of rotation of said crankshaft, a crankshaft rotation tool comprising a disc removably attachable to said pulley at said bolts, said disc extending radially from said axis of rotation and having a plurality of openings around its periphery and having a shank extending axially from said disc on the opposite side of said disc from said crankshaft and axially colinear with said crankshaft, said shank being grippable for rotating same about said axis of rotation, said disc at said peripheral openings engaging respective of said bolts to impart rotation to said pulley and said crankshaft upon rotation by said shank, wherein said bolts have enlarged heads at their ends, and wherein at least one of said openings around said periphery of said disc has a diameter larger than the diameter of its respective said bolt head and slides thereover upon attachment of said disc to said pulley without removal of said bolt from said pulley, and wherein at least another of said openings around said periphery of said disc has a diameter less than the diameter of its respective said bolt head such that the last mentioned respective bolt must be removed from said pulley and then reinserted through said last mentioned opening and into said pulley to retain said disc on said pulley and provide secure retention of said disc on said pulley in high torque applications, including high compression ratio engines such as diesel engines, and prevent slippage of said disc off said pulley during indexing rotation.

15. In an internal combustion engine having a crankshaft extending axially from a crankcase, a pulley mounted to said crankshaft, and a plurality of bolts around a periphery of said pulley radially outward of the axis of rotation of said crankshaft, a crankshaft rotation tool comprising a disc removably attachable to said pulley at said bolts, said disc extending radially from said axis of rotation and having a plurality of openings around its periphery and having a shank extending axially from said disc on the opposite side of said disc from said crankshaft and axially colinear with said crankshaft, said shank being grippable for rotating same about said axis of rotation, said disc at said peripheral openings engaging respective of said bolts to impart rotation to said pulley and said crankshaft upon rotation by said shank, wherein said bolts have enlarged heads at their ends, and wherein all of said openings around said periphery of said disc have a diameter larger than the diameter of their respective bolt heads and slide axially thereover upon attachment of said disc to said pulley, and slide axially thereoff upon removal of said disc from said pulley, all without requiring removal and reinstallation of any of said bolts.

16. In an internal combustion engine having a crankshaft extending axially from a crankcase, a pulley mounted to said crankshaft, and a plurality of bolts around a periphery of said pulley radially outward of the axis of rotation of said crankshaft, a crankshaft rotation tool comprising a disc removably attachable to said pulley at said bolts, said disc extending radially from said axis of rotation and having a plurality of openings around its periphery and having a shank extending axially from said disc on the opposite side of said disc from said crankshaft and axially colinear with said crankshaft, said shank being grippable for rotating same about said axis of rotation, said disc at said peripheral openings engaging respective of said bolts to impart rotation to said pulley and said crankshaft upon rotation by said shank, wherein said engine includes a harmonic balancer mounted by said bolts to said pulley between said pulley and said disc, said disc engaging said bolts and imparting said rotation without removal of said harmonic balancer.

17. In an internal combustion engine having a crankshaft extending axially from a crankcase, a pulley mounted to said crankshaft, and a plurality of bolts around a periphery of said pulley radially outward of the axis of rotation of said crankshaft, a crankshaft rotation tool comprising a disc removably attachable to said pulley at said bolts, said disc extending radially from said axis of rotation and having a plurality of openings around its periphery and having a shank extending axially from said disc on the opposite side of said disc from said crankshaft and axially colinear with said crankshaft, said shank being grippable for rotating same about said axis of rotation, said disc at said peripheral openings engaging respective of said bolts to impart rotation to said pulley and said crankshaft upon rotation by said shank, wherein said engine includes a second pulley mounted to said disc on said opposite side thereof from said crankshaft, wherein said disc is attached to said pulley by said bolts and remains attached after said test and repair adjustments, and wherein said second pulley has an axial opening therethrough receiving said shank, and wherein said second pulley remains attached to said disc during said test and repaired adjustments during indexing rotation by said shank without requiring removal of said second pulley from said disc.

18. The invention according to claim 17 wherein said shank is integrally connected to said disc and extends axially through said axial opening in said second pulley and remains therein after said test and repair adjustments.

19. The invention according to claim 17 wherein said disc has a central configured opening therein receiving said shank in keyed relation, and wherein said shank is removed from said central opening in said disc through said axial opening in said second pulley after said test and repair adjustments.

* * * * *